Dec. 17, 1963   W. L. MORRISON   3,114,248
METHOD AND APPARATUS FOR FREEZING HOT COOKED FOOD
Filed Oct. 20, 1961   4 Sheets-Sheet 4
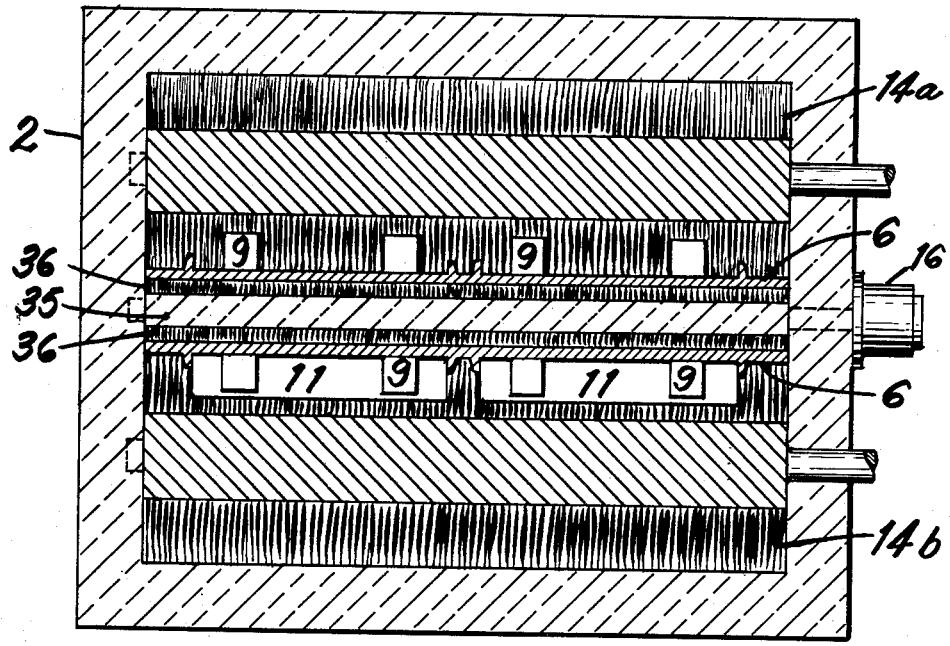
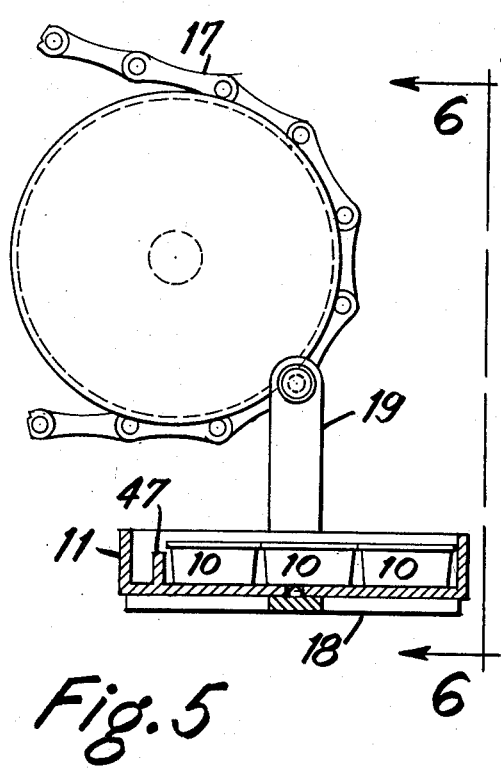
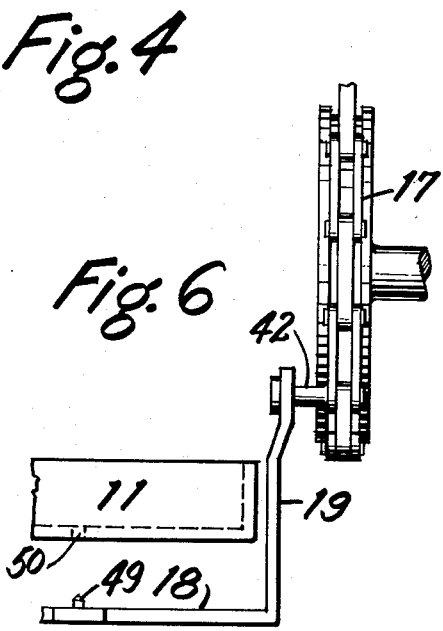
INVENTOR.
WILLARD L. MORRISON
BY PARKER & CARTER
ATTORNEYS

United States Patent Office 3,114,248
Patented Dec. 17, 1963

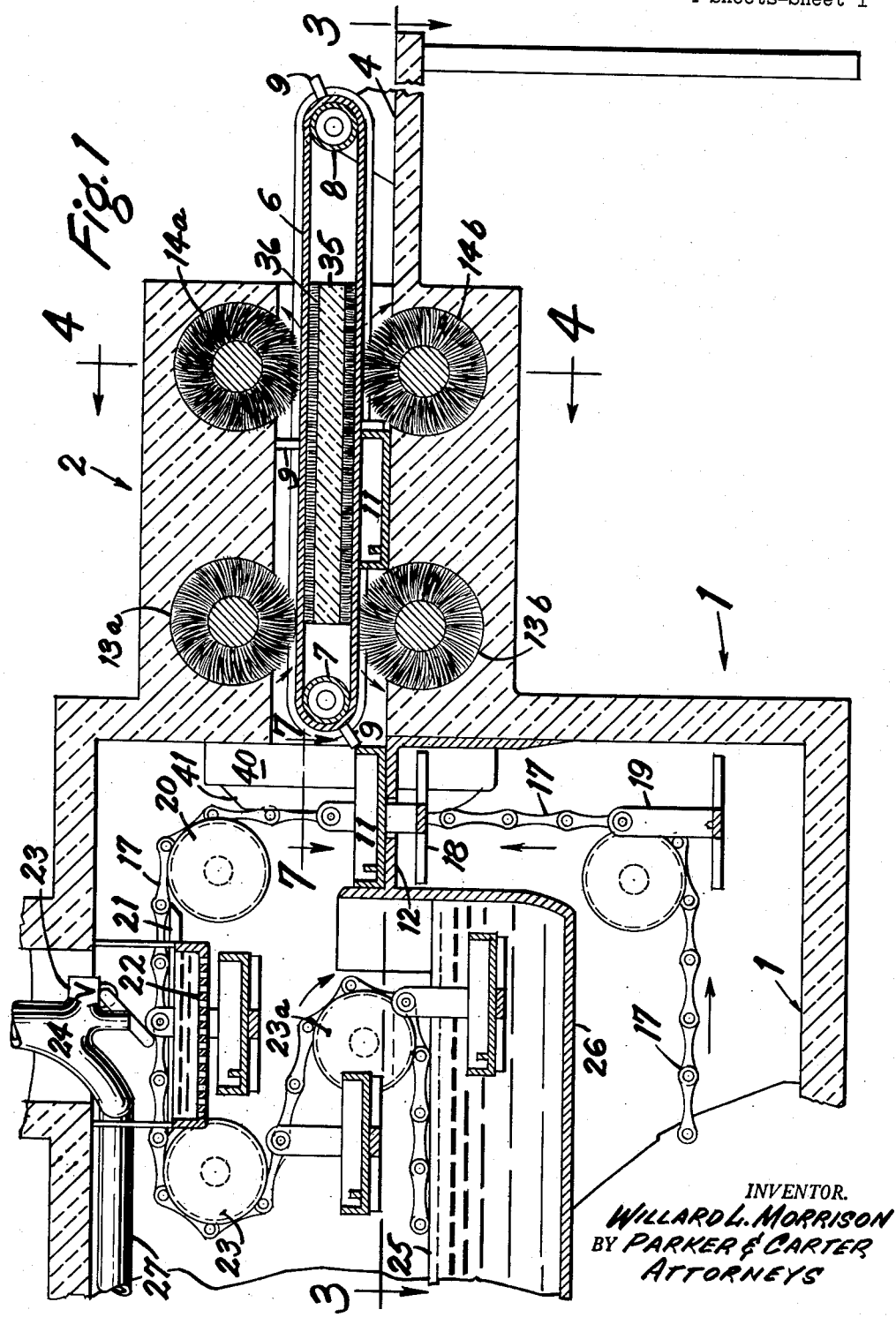

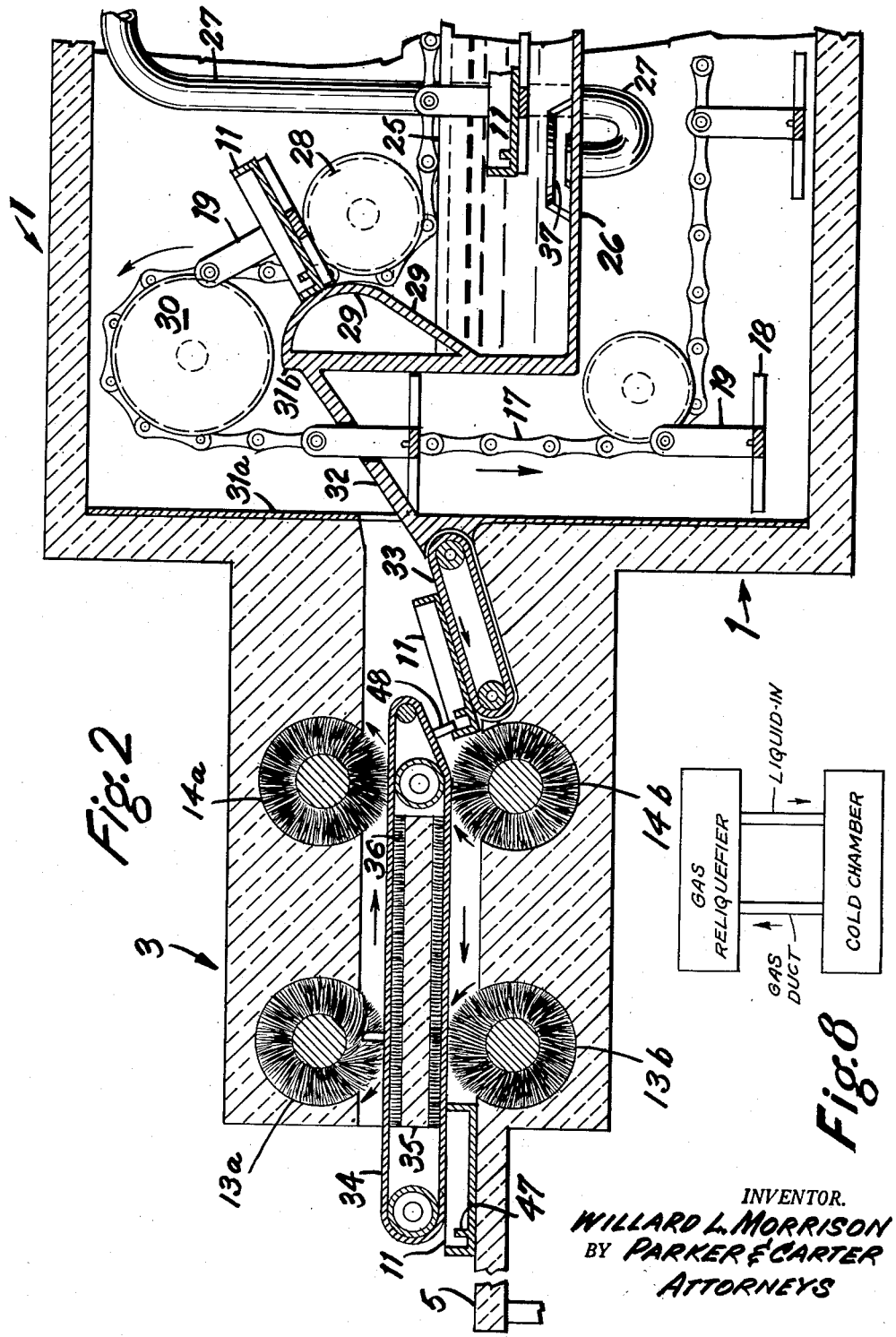

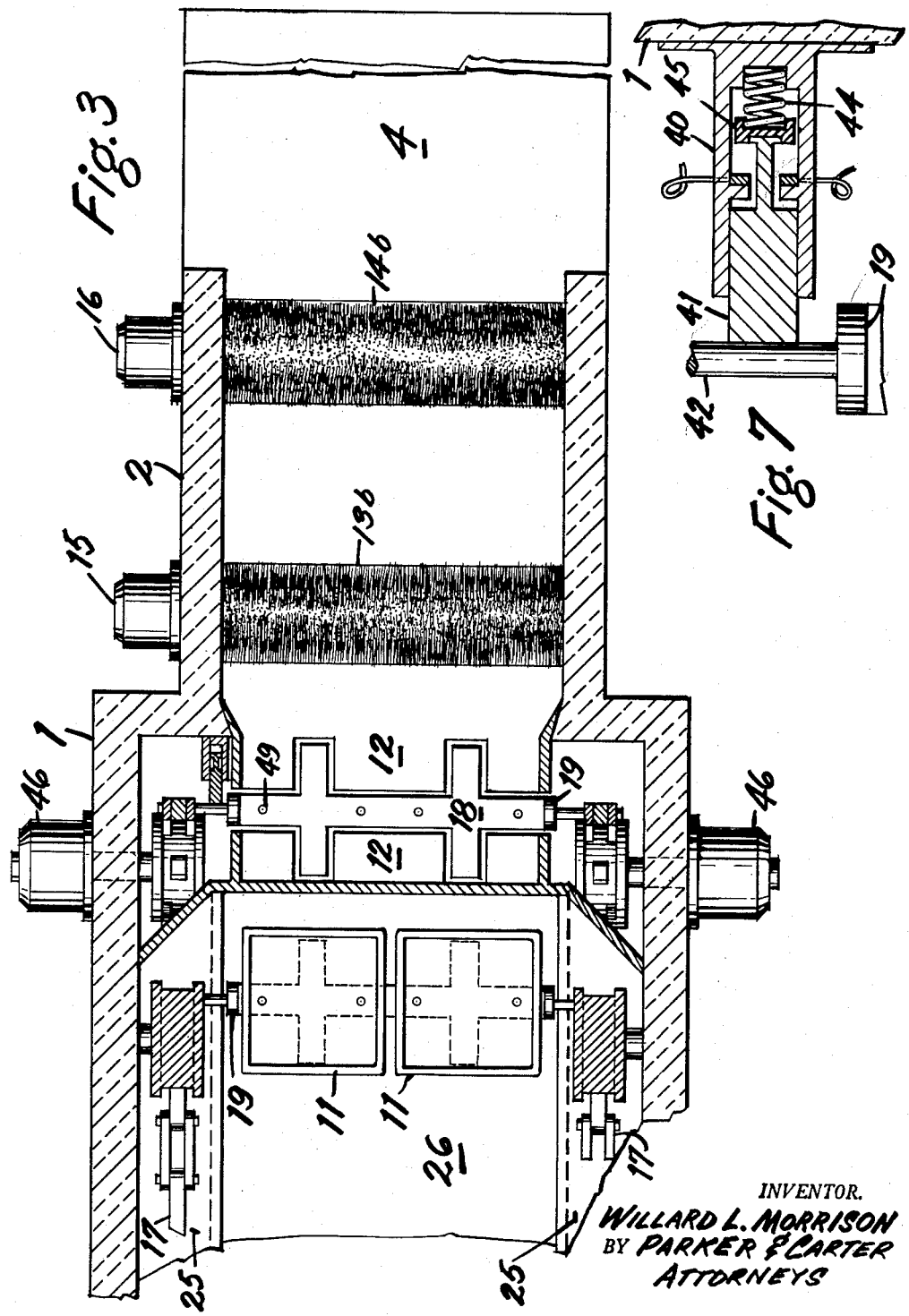

3,114,248
METHOD AND APPARATUS FOR FREEZING HOT COOKED FOOD
Willard L. Morrison, 470 King Muir Road, Lake Forest, Ill.
Filed Oct. 20, 1961, Ser. No. 147,136
11 Claims. (Cl. 62—64)

My invention relates to methods and apparatus for freezing hot cooked food and has for one object to take hot cooked food as it comes from the kettle or oven in a suitable dispensing container and in one continuous process to cool that food down from the cooking temperatures, perhaps 180 degrees F. to a completely frozen state below zero degrees F.

In general, I propose that the cooked food, frequently in individual serving portions, will be placed in open top pans, the surface of the fluid or somewhat fluid food being exposed in the open top pan. The pan is preferably flat and may well be rectangular and will normally be substantially shallower than its length and width.

Each pan will be fed with its hot contents into a cooling chamber. There the open exposed surface of the material will be showered with liquid nitrogen at atmospheric pressure and —320 degrees F. The result of this is to form on the exposed surface of the food, a seal or crust of frozen material. Thereafter the pan with its contents sealed by freezing, will be immersed open faced in a bath of liquid nitrogen, will travel through that bath for a sufficient length of time to freeze the entire contents down to zero degrees F. or lower. The pan will then be removed from the bath, bringing with it, perhaps liquid nitrogen. The pan will then be tilted to spill off into the bath most if not all of such liquid nitrogen and will then be discharged from the cooling chamber for packaging, use or other treatment.

The pans may be fed through one at a time or in batches. The important thing is that each open pan be sealed before it is immersed in the bath by being sprinkled with a gentle shower of liquid nitrogen sufficient to cause the formation of a sealing frozen crust effect but not sufficient to cause any appreciable admixture of liquid nitrogen and the food.

The contact of the liquid nitrogen with the hot food as it is showered upon it or as the hot food is immersed in the bath causes the nitrogen to boil, the hot food furnishing the latent heat of evaporation of the nitrogen.

Such boiling of the liquid results in forming in the cold chamber above the bath an atmosphere of gaseous nitrogen at substantially atmospheric pressure and —320 degrees F. This gaseous nitrogen is withdrawn in consonance with the rate of evaporation, is reliquefied and returned to the bath and to the sprinkler above the bath.

Suitable gas locks are provided at entry and exit ports of the cold chamber to minimize loss of gaseous nitrogen and pollution of the gaseous nitrogen by ambient air.

The sequence is as follows: The food is cooked, taken from the kettle and placed in shallow, open top pans, preferably of the small one or two portion size characteristic of the frozen food industry. These shallow pans will then be assembled in preferably perforate trays, placed on a platform where they will be picked up by a conveyor belt which engages the open top of the tray and passes it forwardly through a gas lock defined by rotating bristle brushes which inhibit gas flow through the lock. The conveyor will feed the tray onto a platform from which it is picked up by a basket, there being a multiplicity of such baskets carried by parallel conveyor chains. The basket will then elevate the tray, move it simultaneously beneath a sprinkling trough from which streams of liquid nitrogen at atmospheric pressure will shower upon the open fluid or fluid-like contents of the pans for a length of time and in sufficient quantity to form a frozen sealing crust completely covering the contents of each pan. Thereafter baskets carrying the pans in the trays will be immersed beneath the level of the bath of liquid nitrogen at atmospheric pressure and will travel along the bath for a length of time sufficient to insure that all of the contents of each pan is solidly frozen. The pans will then be raised above the bath and tilted to spill any remaining liquid nitrogen out of the pans so that it will return to the bath and not be wasted. Thereafter the pans will be fed to a discharge point where as the basket goes down through a discharge platform, the trays slide off and will be engaged by a belt which will draw the trays through a discharge gas lock past similar gas flow inhibiting brushes along a table from which the packages can be removed for further use, treatment or disposal.

This application is a continuation in part of my copending application 39,949, filed June 30, 1960, now abandoned.

My invention is illustrated diagrammatically in the accompanying drawings, wherein—

FIGURE 1 is a longitudinal section through the feed end of the apparatus;

FIGURE 2 is a longitudinal section complementary to FIGURE 1 through the discharge end of the apparatus;

FIGURE 3 is a section along the line 3—3 of FIGURE 1;

FIGURE 4 is a section along the line 4—4 of FIGURE 1 with parts in slightly different position;

FIGURE 5 is a side elevation in part section with parts omitted;

FIGURE 6 is a section along the lines 6—6 of FIGURE 5;

FIGURE 7 is a section along the line 7—7 of FIGURE 1.

FIGURE 8 is a diagrammatic illustration.

Like parts are indicated by like characters throughout the specification and drawings.

The insulating housing 1 is provided at one end with an intake gas lock 2, at the other end with a discharge gas lock 3. A feed table 4 is in prolongation of the gas intake 2, and 5 is a discharge table in prolongation of the discharge gas lock 3. The two gas locks are generally similar. The intake gas lock 2 has a flexible belt 6 traveling around pulleys 7 and 8 and having cleats 9 thereon. The clearance between the top and bottom of the belt and the floor and ceiling of the gas lock tunnel 2 is just sufficient to permit passage of the cleats. When open faced flat food pans 10 filled with cooked food from the oven or kettle condition are placed on the perforate trays 11, the trays may be fed into the path of the belt so that the lugs 9 pick them up and feed the trays inwardly onto the apertured platform 12. The lugs as they travel around the pulley 7 being sufficient to center the tray on the platform. The clearance between the upper and lower portions of the belt 6 and the floor and ceiling of the gas lock are filled by the rotating brushes 13a and 13b, 14a and 14b, driven by motors 15, 16, preferably in opposite directions with the brush 13a and 14b in clockwise and the brush 13b and 14a in counter clockwise direction, thus inhibiting gas flow through the lock, the brush bristles being flexible enough to be pressed aside to permit passage of the lugs and of the trays. The brushes maintain a generally gas tight packing during such movement.

Conveyor belts 17 at opposite sides of the insulated housing travel over pulleys as indicated and carry suspended between them baskets 18 hung from hangers 19 pivoted on the belts so that the basket always hangs by gravity with its supporting surface horizontal unless as will hereinafter appear, it is purposely tilted.

The platform 12 is cut away to permit passage of the cross shaped basket 18 so that as the belt moves in the direction of the arrow, successive baskets pick up successive trays and raise them upwardly as the belt travels around the pulley 20. It travels along a track 21 with the perforate tray and contents below a sprinkler vessel 22 which receives liquid nitrogen through a discharge valve 23 from duct 24 to pour liquid nitrogen at atmospheric pressure onto the surface of the material in each tray to form a frozen crust thereon. The belt then travels over the pulleys 23, 23a to the lower position at which the belts travel along the track 25 with each basket and its contents completely immersed in the bath of liquid nitrogen contained in the receptable 26. Liquid nitrogen is supplied through the duct 27 from the duct 24. Thereafter the belt travels over the pulley 28 past the hump 29 which tilts each basket to one side to spill out of the pans any liquid nitrogen so that the liquid nitrogen may return back to the bath. Thereafter the belt travels over the pulley 30 downward past the guides 31a and 31b in the sloped discharge platform 32, the platform being cut away similarly to the cut away portion of platform 12 to permit passage of the basket. As this occurs, the tray being disengaged, slides downwardly to contact the belt 33 which in turn insures that the tray 11 will pass under the influence of one of the lugs on the discharge belt 34 to be carried outwardly through the gas lock 3 to the discharge table 5.

The space inside the two belts 34 and 6 in the air locks is filled by a fixed filler body 35 which is faced with fibrous brush like members 36 in contact with the inside of the belt, thus assisting in inhibiting flow of gas through the locks.

The baskets 18 on the return pass beneath the tank 26 in the chamber filled with the cold gaseous nitrogen. The baffle 37 distributes the liquid nitrogen as it comes down through the pipe 27 to the tank 26 to avoid excessive ebullition.

The operation of the brushes 13a and 13b and 14a and 14b at both the feed and discharge ends of the apparatus are the same but the drive of the belt may be continuous whereas it is desirable to have the drive of the belt 6 intermittent.

The conveyor chain travels normally at uniform rate of speed and as each perforate tray 11 with its load of pans is fed forwardly into the platform 12, it is important that such trays only be fed at the right time so as to be picked up by the basket 18.

40 is a switch housing from which projects an actuating button 41 to be engaged by the pin 42 which supports the hanger 19. In the position shown in FIGURE 7, the button 41 being pushed back by the hanger pin 42 breaks the circuit and no current is supplied to the driving motors 15, 16. When the pin 42 passes on, the spring 44 will move the keeper 45 into position to close the circuit and the next perforate tray 11 will be fed forward onto the platform 12. The motor 46 requires no such separate control but may be started and stopped in the usual way.

Each tray 11 contains a rib 47 to hold the pans 10 together and provide a slight clearance so that the lugs 48 on the belt 34 may engage each successive tray without interfering with the food pans.

In order to avoid possible displacement of the tray on the basket, the basket carries pins 49 which penetrate apertures 50 in the trays 11 so that once the tray is seated, lateral displacement will not occur.

The brush gas lock disclosed in this application is substantially the same in principle as the gas lock disclosed in my co-pending application Ser. No. 33,204, filed June 1, 1960, allowed September 2, 1962.

I have not disclosed the details of the reliquefier. Any apparatus that will take the gaseous nitrogen at substantially —320 degrees F. from the cold chamber will reliquefy it and return it to the bath will accomplish my purpose. The details of the reliquefier form no part of the present invention but it is important to note that reliquefaction is an important factor because of the cost of replacing the liquid nitrogen. The apparatus would function if the gaseous nitrogen were wasted but that would be an exceedingly expensive operation.

I have used the term "nitrogen" as generic to any type of cold boiling liquid such as nitrogen or helium or other gases that are liquid at very low temperatures and atmospheric pressure and which can be allowed to contact the foodstuffs without danger to the food or to the operators in charge of the operation.

The arrangement of the food pans on the perforate trays and of the trays on the cradles or baskets 18 is not critical. For convenience I propose to use on each basket two square trays and each square tray can hold nine square pans. The pans will usually be of aluminum and under ordinary circumstances open at the top as indicated.

It is preferable to pass the open pans along a horizontal path beneath the sprinkler head but the important thing is that the open exposed surface of the food be sprinkled with a gentle rain of liquid nitrogen which will not disturb the food but will freeze it to form the necessary hard frozen crust and the pan might be moved vertically or horizontally or along an inclined path just so long as the sprinkling of liquid nitrogen results in a crust.

Under some circumstances the pans or containers will be hooded or closed, and when hooded or closed they may be passed along other than horizontal paths because the hood will prevent spillage of the contents of the pan even though it might not yet have been frozen.

I prefer to use liquid nitrogen at atmospheric pressure because it boils at that pressure and —320 deg. F. and because it has no deleterious effect on the food. Other refrigerants may be used provided they pass from liquid to gaseous states at temperatures below zero degree F. at substantially atmospheric pressures and in the interest of clarity I have referred in the claims to "liquid and gaseous nitrogen" but it is understood that these are intended as generic terms covering other such refrigerants having the above characteristics.

This results in a 2-stage freezing operation where at first the outer unfrozen peripheries of the food material, which may be liquid or solid, are frozen to define a surrounding crust, after which further contact with the refrigerant results in solidification and freezing of the entire mass.

In the diagrammatic showing of FIGURE 8, the gas evolved in the housing 1 escapes through the duct as shown to the reliquefier. The liquid is discharged from that housing through the duct 24 to the bath.

I claim:

1. Method of freezing food which consists in placing it in an open face portable pan, inserting the pan into a cooling chamber filled with gaseous nitrogen at substantially atmospheric pressure and —320 degrees F., sprinkling the exposed surface of the material in the pan with liquid nitrogen at substantially atmospheric pressure and —320 degrees F. until a hard, frozen crust is formed over such surface, then immersing the pan into a bath of liquid nitrogen at atmospheric pressure and —320 degrees F. below the surface of the bath until the entire contents of the pan is solidly frozen, then withdrawing the pan from the bath, removing any liquid nitrogen remaining in the pan and then discharging the pan and its frozen contents from the cooling chamber.

2. Method of freezing food which consists in placing it in an open face portable pan, inserting the pan into a cooling chamber filled with gaseous nitrogen at substantially atmospheric pressure and —320 degrees F., sprinkling the exposed surface of the material in the pan with liquid nitrogen at substantially atmospheric pressure and —320 degrees F. until a hard, frozen crust is formed over such surface, then immersing the pan into a bath of liquid nitrogen at atmospheric pressure and —320 degrees F. below the surface of the bath until the entire contents of the pan is solidly frozen, then withdrawing the pan from the bath, spilling any liquid nitrogen remaining in the pan back into the bath and then discharging the pan and its frozen contents from the chamber.

3. Method of freezing food which consists in placing the cooked food in fluid condition in an open face portable pan, inserting the pan into a cooling chamber filled with gaseous nitrogen at substantially atmospheric pressure and −320 degrees F., sprinkling the exposed surface of the material in the pan with liquid nitrogen at substantially atmospheric pressure and −320 degrees F. until a hard, frozen crust is formed over such surface, then immersing the pan into a bath of liquid nitrogen at atmospheric pressure and −320 degrees F. below the surface of the bath until the entire contents of the pan is solidly frozen, then withdrawing the pan from the bath, removing any liquid nitrogen remaining in the pan and then discharging the pan and its frozen contents from the cooling chamber.

4. Method of freezing food which consists in placing it in an open face portable pan, inserting the pan into a cooling chamber filled with gaseous nitrogen at substantially atmospheric pressure and −320 degrees F., sprinkling the exposed surface of the material in the pan with liquid nitrogen at substantially atmospheric pressure and −320 degrees F. until a hard, frozen crust is formed over such surface, then immersing the pan into a bath of liquid nitrogen at atmospheric pressure and −320 degrees F. below the surface of the bath until the entire contents of the pan is solidly frozen, then withdrawing the pan from the bath, removing any liquid nitrogen remaining in the pan and then discharging the pan and its frozen contents from the cooling chamber, preventing gas movement into and out of the cooling chamber as the pans are inserted in and withdrawn therefrom.

5. Method of freezing food which consists in placing it in an open face portable pan, inserting the pan into a cooling chamber filled with gaseous nitrogen at substantially atmospheric pressure and −320 degrees F., sprinkling the exposed surface of the material in the pan with liquid nitrogen at substantially atmospheric pressure and −320 degrees F. until a hard, frozen crust is formed over such surface, then immersing the pan into a bath of liquid nitrogen at atmospheric pressure and −320 degrees F. below the surface of the bath until the entire contents of the pan is solidly frozen, then withdrawing the pan from the bath and discharging it and its frozen contents from the chamber, preventing gas movement into and out of the cooling chamber as the pans are inserted in and withdrawn therefrom.

6. Means for freezing food which includes an insulated housing with entrance and exit ports and gas locks associated with said ports, a conveyor in the housing, open top food pans carried thereby, a sprinkler tank in the housing, a bath tank in the housing, means for guiding the food pans along a horizontal path beneath the sprinkler tank but above the bath tank and means for thereafter guiding the food pans along a path within and below the level of the bath, means for supplying liquid nitrogen to the bath and to the sprinkler tank, means for withdrawing the resultant gas from the housing for reliquefying it and returning it to the bath and the sprinkler tank.

7. In a cold chamber, means for conveying food thereto in an open top shallow pan, means for first sprinkling the exposed surface of the food in the pan with liquid nitrogen at atmospheric pressure and −320 degrees F. until a hard, frozen crust is formed on such surface, means for thereafter immersing the pan in a bath of liquid nitrogen, means for withdrawing the pan from the bath, means for removing any liquid nitrogen in the pan, and means for discharging the pan from the cold chamber.

8. In a cold chamber, means for conveying food thereto in an open top shallow pan, means for first sprinkling the exposed surface of the food in the pan with liquid nitrogen at atmospheric pressure and −320 degrees F. until a hard, frozen crust is formed on such surface, means for thereafter immersing the pan in a bath of liquid nitrogen, means for withdrawing the pan from the bath, means for tilting the pan to remove liquid nitrogen in the pan, and means for discharging the pan from the cold chamber.

9. In combination, a bath vessel, a bath therein, a sprinkler vessel located above and in register with it, means for supplying liquid nitrogen to both vessels, means for conveying open faced food pans beneath and in register with the sprinkler vessel, means for thereafter lowering the pans into and conveying them through the bath, means for thereafter withdrawing them from the bath, tilting them to spill out any liquid left therein for return to the bath, means for thereafter discharging the pans for further treatment and use.

10. Means for freezing food which includes an insulated housing with entrance and exit ports and gas locks associated with said ports, a conveyor in the housing, food packages carried thereby, a sprinkler tank in the housing, a bath tank in the housing, means for guiding the food packages along a path beneath the sprinkler tank but above the bath tank and means for thereafter guiding the food packages along a path within and below the level of the bath, means for supplying liquid nitrogen to the bath and to the sprinkler tank, means for withdrawing the resultant gas from the housing for reliquefying it and returning it to the bath and the sprinkler tank.

11. Method of freezing food which consists in packaging it, inserting the package into a cooling chamber filled with liquid nitrogen at substantially atmospheric pressure and −320 degrees F., wetting the package with liquid nitrogen at substantially atmospheric pressure and −320 degrees F. until a hard, frozen crust is formed about the food in the package, then immersing the package into a bath of liquid nitrogen at atmospheric pressure and −320 degrees F. below the surface of the bath until the entire contents of the package is solidly frozen, then withdrawing the package from the bath, removing any liquid nitrogen thereon and discharging the package and its frozen contents from the cooling chamber, preventing gas movement into and out of the cooling chamber as the packages are inserted in and withdrawn therefrom.

References Cited in the file of this patent

UNITED STATES PATENTS

| | | |
|---|---|---|
| 1,944,857 | Atwell | Jan. 23, 1934 |
| 2,267,789 | Conn | Dec. 30, 1941 |
| 2,784,567 | Reynolds | Mar. 12, 1957 |
| 2,787,141 | Julius | Apr. 2, 1957 |
| 3,006,774 | Zebarth | Oct. 31, 1961 |

FOREIGN PATENTS

| | | |
|---|---|---|
| 223,611 | Australia | Aug. 20, 1959 |